(12) United States Patent
Moudgill

(10) Patent No.: US 6,578,094 B1
(45) Date of Patent: Jun. 10, 2003

(54) METHOD FOR PREVENTING BUFFER OVERFLOW ATTACKS

(75) Inventor: Mayan Moudgill, Ossining, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/517,205

(22) Filed: Mar. 2, 2000

(51) Int. Cl.$^7$ .................................................. G06F 5/00
(52) U.S. Cl. ........................... 710/57; 710/40; 711/170; 712/228
(58) Field of Search ................................. 710/5, 20, 52, 710/55, 56, 57, 65, 40, 54; 712/228, 227, 225; 713/200; 714/770; 711/132, 170–173

(56) References Cited

U.S. PATENT DOCUMENTS

| | | | |
|---|---|---|---|
| 5,535,329 A | * 7/1996 | Hastings | 714/35 |
| 5,671,332 A | * 9/1997 | Viot | 706/13 |
| 5,949,973 A | * 9/1999 | Yarom | 713/200 |
| 6,014,723 A | * 1/2000 | Tremblay et al. | 711/1 |
| 6,101,580 A | * 8/2000 | Agesen et al. | 711/132 |
| 6,185,673 B1 | * 2/2001 | Dewan | 712/228 |
| 6,412,071 B1 | * 6/2002 | Hollander et al. | 713/200 |
| 6,412,107 B1 | * 6/2002 | Cyran et al. | 717/148 |

OTHER PUBLICATIONS

Cowan, et al., "StackGuard: Automatic Adaptive Detection and Prevention of Buffer Overflow Attacks", Department of Computer Science and Engineering, Oregon Graduate Institute of Science and Technology.

Nathan P. Smith, "Stack Smashing Vulnerabilities in the UNIX Operating System", Computer Science Department, Southern Connecticut State University, 501 Crescent Street, New Haven, CT 06515, Copyright 1977 Smith.

* cited by examiner

Primary Examiner—Jeffrey Gaffin
Assistant Examiner—RiJue Mai
(74) Attorney, Agent, or Firm—F. Chau & Associates, LLP

(57) ABSTRACT

A method that allows a called procedure to determine a "safe" upper bound value representing the amount of data that can be written to a stack allocated array/buffer without overwriting any stack-defined data stored in reserved memory blocks in the stack (i.e., any region in memory that is preserved by a calling sequence). More specifically, when a called procedure is passed a stack allocated array/buffer as an argument, the method of the present invention allows the called procedure to call a "bounds checking" procedure that calculates and returns the "safe" upper bound value, thereby allowing the called procedure to prevent, e.g., potentially overwriting a procedure return value due to array overflow when writing data to the array. Advantageously, the "bounds checking" procedure may readily be implemented in any operating system/library to provide secure implementations of library functions that provide buffer overflow vulnerabilities.

21 Claims, 3 Drawing Sheets

METHOD FOR PREVENTING BUFFER OVERFLOW ATTACKS

BACKGROUND

1. Technical Field

The present invention relates generally to a method for preventing overflow of arrays/buffers that are dynamically allocated on a stack and, in particular, to a method that allows a procedure, which is passed a stack allocated array/buffer as an argument, to determine a "safe" upper bound on the size of the stack allocated array/buffer to thereby prevent back-chain and/or procedure return pointers from being overwritten due to overflow of the array/buffer.

2. Description of Related Art

Virtually all programs written in modern programming languages, such as C, C++ or Java, use a stack for maintaining a program stack while the program is running. A stack is a contiguous region of memory (comprising data items such as words, character, bits, etc.) that grows and shrinks based on the demands of the program. Typically, one end of this stack region (i.e., the bottom of the stack) is fixed at a predetermined address in memory, while the other end of the stack (i.e., the top of the stack) moves up/down to increase/decrease the amount of stack space available to the program. The program maintains what is known as a "stack pointer" that points the current position of the mutable end (i.e., the top of the stack). More specifically, the stack pointer is a either a register or memory word that contains the address of the top of the stack.

Programs execute by calling functions (or procedures or subroutines) which, in turn, may call other functions, etc. Each time a function is called, a block of memory called a "stack frame" is allocated on the stack to accommodate the state of the called function, i.e., for storing parameters, a return address and local variable, if any, associated with the called function. The running program typically maintains a pointer to the start of the region, known as the "frame pointer".

Referring to FIG. 1, a diagram depicts a portion of a program stack in memory in which several stack frames are allocated. The stack in FIG. 1 "grows downward" from a high memory address to a low memory address each time a stack frame is added in response to a procedure call. A Current Stack Frame is associated with the last called function. It is to be understood that the stack frame structures depicted in FIG. 1 are, in general, exemplary of conventional structures that are well-known in the art. In general, a frame typically comprises data blocks for storing the following pieces of information:

a function return address: the instruction to be executed after the called function completes execution;

a previous (old) frame pointer: this is the frame pointer of the calling function;

parameters: the arguments that are passed by the calling function to the called function;

local variables: this is where the state specific to the function is stored; and a frame pointer (FP) or local base (LB) pointer: this pointer points to a fixed location in the frame (e.g., in FIG. 1, the FP is used to identify the base (beginning) of the current stack frame). Because the FP points to a fixed location, it may be used to identify the address of the local variables.

By way of example in FIG. 1, conceptually, the first variable (Local Var1) for the current function is at address (Frame Pointer+offset1), and the second variable (Local Var2) is at (Frame Pointer+offset2). In addition, in the illustrative embodiment of FIG. 1, the Frame Pointer points to the address of the Old Frame Pointer of the previous stack frame associated with the calling function (although, in general, the FP plus some offset points to the old frame (the offset in FIG. 1 has a value of 0)). This mechanism allows what is known as "following the back chain" to find the beginning of any previous stack frame on the stack.

A "calling sequence" refers to the instructions that are required to call a function and pass it parameters. During execution of the calling sequence, a stack frame is generated and "pushed" onto the stack for the called function. Calling sequences and stack frame organizations differ from operating system to operating system. In general, a typical calling sequence comprises the following steps. First, the calling function will push all arguments on the stack (i.e., pass the parameters to the called function). Next, the "return address" is pushed onto the stack and then and the program "jumps" to the new routine (called function). Next, the current FP pointer is pushed onto to the stack in the memory location after the "return address" (i.e., this saves the current FP as the "Old FP" so that it can be restored at procedure exit). The FP is set to the current stack address (i.e., the stack pointer is copied into FP to create the new (current) FP). Finally, the stack pointer is incremented to reserve the space needed to store the local variables of the called function.

A corresponding return sequence comprises the following steps. First, the stack pointer is set to the value of current FP. The next steps are to pop stack into frame pointer, pop stack, and then jump to top of stack value.

FIG. 1 illustrates a Current Stack Frame as comprising the memory locations from the Frame Pointer to the Stack Pointer (which points to the top of the stack). In addition, a Previous Stack Frame comprises the memory locations beginning from Old Frame Pointer2 and ending at Return Address1. It is assumed that the function associated with the Previous Stack Frame is a "calling function" that calls the function (a "called function") associated with the Current Stack Frame. It is further assumed that parameters Arg1 and Arg2 are the parameters that are passed to the called function from the calling function. Although Arg1, Arg2 and Return Address1 are shown as being part of the Previous Stack Frame of the calling function for purposes of illustration, it is to be understood that other conventions consider such values as being elements of the Current Stack Frame.

Referring now to FIG. 2, a diagram illustrates a stack frame structure for the known AIX platform. AIX is an open operating system developed by International Business Machines (IBM) Corporation that is based on a version of UNIX. The AIX stack frame structure differs, for instance, from the stack frame structure of FIG. 1 in that it dispenses with a frame pointer, basing everything off a Stack Pointer (in some special cases, however AIX will use a frame pointer). As shown in FIG. 2, in AIX, stacks grow downwards (i.e. the Stack Pointer decreases as new frames are created). Furthermore, in AIX, arrays typically grow upwards. For instance, as shown in FIG. 2, an Array Pointer is incremented as larger indexed elements of an array, Array Var[1] . . . Array Var[n], are accessed. The Stack Pointer points to the memory location at the top of a Current Frame associated with the procedure being executed. This memory location contains a Back Chain Pointer2 which points to a memory location at the top of the previous stack frame of the calling procedure (which memory location contains a Back Chain Pointer1 that points to the top of its calling procedure, and so on). The Back Chain Pointers provide the mechanism for "following the back chain." The back chain pointer (not shown) of the first procedure in the program has a value of 0.

Furthermore, a Procedure Return Pointer1 contains the address (in the calling procedure) to which the called current procedure must return after it completes execution. In particular, when the called procedure completes, the Stack Pointer is set to the top of the calling procedure by reading the Back Chain Pointer2. The Procedure Return Pointer1 is then read and the program branches to this address.

The overflow of a stack allocated array (or buffer) can potentially lead to what is known as a "Stack Smashing Attack." Buffer overflow occurs when incorrect programming allows a user of a program to write beyond the bounds of some array (buffer). This can occur, for example, when the programmer expects the user to input no more than N characters of input and allocates an array of size N, but does not add any code to prevent the user from inputting more than N characters. In that case a user entering more than N characters will write beyond the bounds of the array into adjacent memory. If the buffer that overflows was part of the stack, the overflow will overwrite the portions of the stack adjacent to the buffer. Further, if the overflow is large enough, the function return address of some stack frame will be overwritten. Eventually, when the function for that stack returns, instead of returning to the correct address, it will return to an address determined by the overflow. This chain of events may be used by a hacker to perform what is known as "stack smashing."

By way of example with reference to FIG. 1, it is assumed that the value of Arg1 that is passed to the called function is a pointer that points to a stack allocated array, Local VarB[1] . . . Local VarB[n], that is located within the Previous Stack Frame associated with the calling function. Depending on the direction of the array growth (in FIG. 1, the array is shown as growing in either direction), the overflow of the array can lead to overwriting either Return Address1 or Old Frame Pointer2 of the Previous Stack Frame and/or overwriting Return Address2 of the stack frame previous to the Previous Stack Frame.

In addition, with reference to FIG. 2, the Current Frame is shown having an array, Array Var[1] . . . Array Var[n], which grows upward. If the calling procedure, or more typically, some procedure it calls, writes beyond this pointer, it will eventually overwrite both the Back Chain Pointer1 and the Procedure Return Pointer1. Now, when the procedure returns, the Stack Pointer will be set to some unanticipated location, and the program will branch to some unanticipated location.

Stack smashing allows a malicious user ("attacker") to break security, and obtain privileged access. A typical stack smashing process consists of the following steps:
  the attacker identifies a privileged program that contains a potential buffer overflow;
  the attacker then proceeds to input into the buffer a string that is actually executable binary code native to the machine being attacked, that invokes some restricted action, the "attack code";
  the attacker continues to input into the buffer until the buffer overflows into some function return pointer and sets that pointer to the start of the attack code; and
  the privileged program then (eventually) returns from the function whose return pointer was overwritten, and starts executing code invoking the restricted action. Since the program is a privileged program, the restricted action is executed. Thus, a buffer overflow in a privileged program allows the attacker to perform restricted actions that would otherwise be forbidden to him. This attack is variously known as a "buffer overrun" or "stack smashing" attack.

There have many techniques developed to prevent buffer overrun and stack smashing attacks. For instance, one method involves writing a compiler that will compile a C program so that pointers carry bounds information with them. This method has several disadvantages. For instance, this method requires the applications and libraries to be recompiled with the safe compiler. In addition, the sizes of the pointers typically double. Furthermore, while some safe compilers can handle all strictly compliant ANSI C programs, they break down on various non-compliant idioms.

Another approach is to make the stack segments non-executable. This requires operating system intervention, but with the appropriate operating system support should offer a viable solution.

Yet another approach is one in which the compiler puts a "canary" word just before the procedure return pointer on the stack. A canary word is simply a word containing a special pattern. Prior to returning from a routine, the code determines if the word has been overwritten. If so, it is determined that there has been a buffer overrun. Apart from requiring recompilation, this technique also suffers from the problem that it can be defeated by, e.g., guessing the canary word.

Accordingly, there is a need for a simplified, yet powerful and efficient, method that allows a called function to ascertain a upper limit to the amount of data that can be written to a stack allocated array/buffer so as to prevent back chain and/or procedure return pointers from potentially being overwritten due to array/buffer overrun.

SUMMARY OF THE INVENTION

The present invention is directed to a method that allows a called procedure to determine a "safe" upper bound value representing the amount of data that can be written to a stack allocated array/buffer without overwriting any stack-defined data stored in reserved memory blocks within the stack (i.e., any region in memory that is preserved by a calling sequence). More specifically, when a called procedure is passed a stack allocated array/buffer as an argument, the method of the present invention allows the called procedure to call a "bounds checking" procedure that calculates and returns the "safe" upper bound value, thereby allowing the called procedure to, e.g., prevent a procedure return value from being overwritten due to array overflow when writing data to the array.

In one aspect of the present invention, a method for providing bounds checking on the size of input data being stored in an array comprises the steps of: determining if the array is located on a program stack; determining a boundary value representing a maximum amount of data that can be written to the array without overwriting a predefined region in the program stack, if the array is determined to be on the program stack; and writing data to the array based on the determined boundary value.

In another aspect of the present invention, the predefined region comprises a memory location that is preserved by a calling sequence to store, e.g., a procedure return pointer.

In yet another aspect of the invention, the step of determining a boundary value of the array comprises the steps of following the back chain pointers of stack frames on the stack to locate a stack frame containing the array and then, depending on the direction of the growth of the array, calculating the distance between the beginning of the array and the closest predefined region in the program stack. Depending on the given stack structure, the closest predefined region can be, for instance, the beginning or end location of the stack frame containing the array.

Advantageously, the present invention may readily be implemented in any operating system/library to provide secure implementations of library functions that have buffer overflow vulnerabilities.

These and other aspects, features, and advantages of the present invention will become apparent from the following detailed description of the preferred embodiments, which is to be read in connection with the accompanying drawings.

DETAILED DESCRIPTION OF PREFERRED EMBODIMENTS

Figure 1:
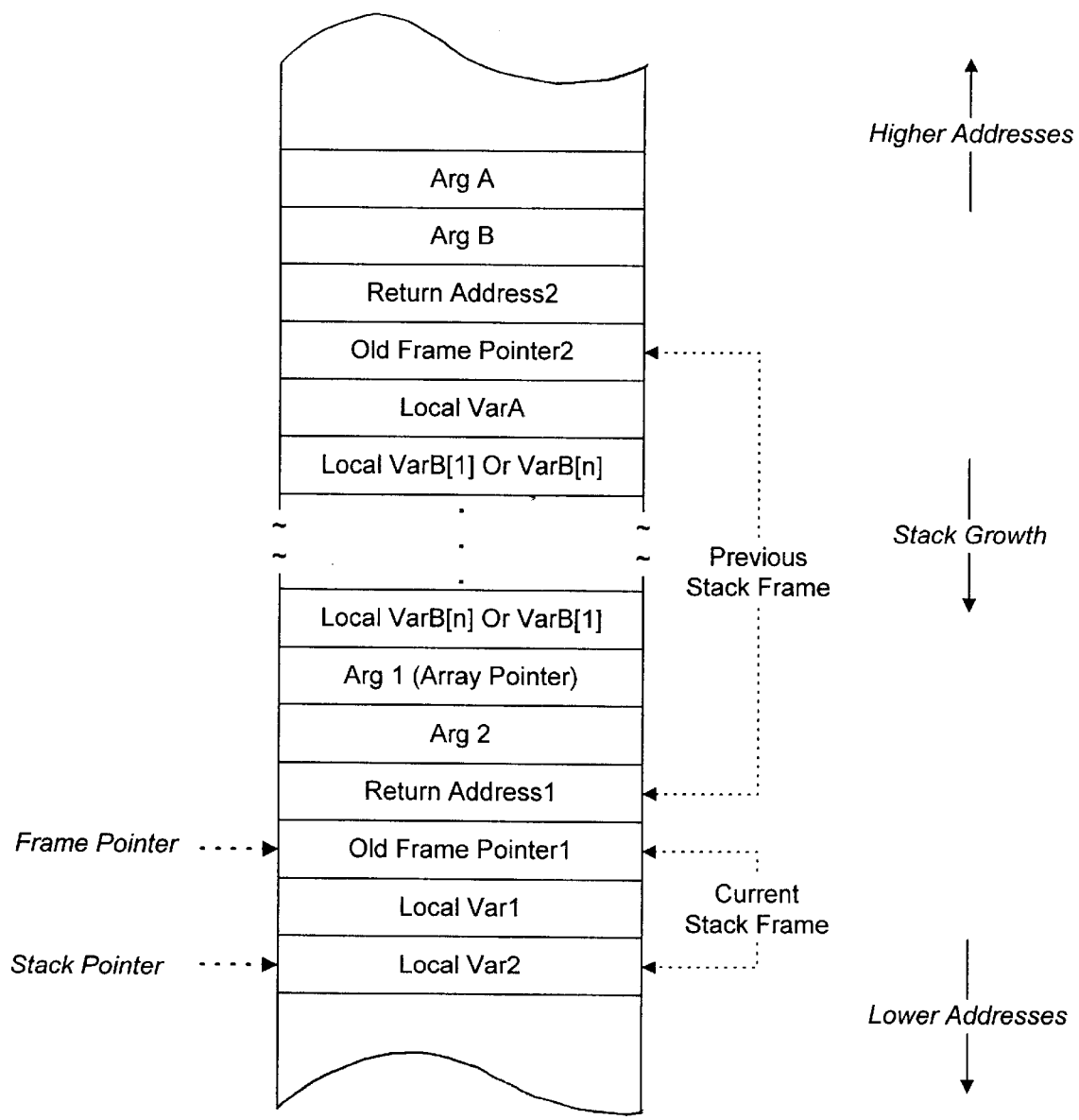
FIG. 1 is a diagram of a portion of a stack in memory illustrating a general stack frame structure according to the prior art.

It is to be understood that method steps described herein are preferably implemented in software as an application comprising program instructions that are tangibly embodied on a program storage device (e.g., RAM, ROM, etc.) and executable by any platform comprising suitable architecture. It is to be further understood that, because the process steps depicted in the accompanying Figures are preferably implemented in software, the actual connections between such steps may differ depending upon the manner in which the present invention is programmed. Given the teachings herein, one of ordinary skill in the related art will be able to contemplate these and similar implementations or configurations of the present invention.

In accordance with the present invention, a technique is employed that allows a called procedure to determine a "safe" upper bound value representing the amount of data that can be written to a stack allocated array/buffer without overwriting any stack-defined data stored in a reserved memory location on the stack (i.e., any region in memory that is preserved by a calling sequence). Conventionally, many procedures (functions, routines) are passed the address of the array as an argument, but are not passed the size of the array. Thus, it is not possible for the procedure to determine what the size of the array is and, consequently, the procedure can not be rewritten to guard against buffer overruns. I/O procedures are notorious for having this buffer overflow vulnerability. For example, a gets( ) library function is passed an array, which it fills in by reading a line of data from a console. The gets( ) function, however, is not passed the size of the array. If the programmer provides an array that is large enough to hold 200 characters, but the user types in a line of 300 characters, the gets( ) function will write a 100 characters beyond the boundary of the array. Therefore, any privileged that uses gets( ) to obtain input is vulnerable to a stack-smashing attack.

As described in greater detail below, the present invention provides a technique (e.g., a "bounds checking" function) that allows the programmer of a routine such as gets( ) to determine if an array passed to it is allocated on the stack, and if so, to determine an upper bound value "N" on the amount of data that may be written to the array. The upper bound value does not have to be completely accurate of the actual size of the array since the value N may be larger than the size of the array. The upper bound value "N" is determined such that if at most "N" characters are written to the array, it is guaranteed not to overwrite, for example, a function return pointer. This value "N" is referred to herein as a "safe" upper bound value. Advantageously, by using the present technique, a programmer can rewrite a routine that lacks array bounds checking (and is vulnerable to buffer overflow) to a routine that is guaranteed not to overwrite, e.g., the function return pointer and, consequently, not be vulnerable to stack smashing attacks.

Figure 3:
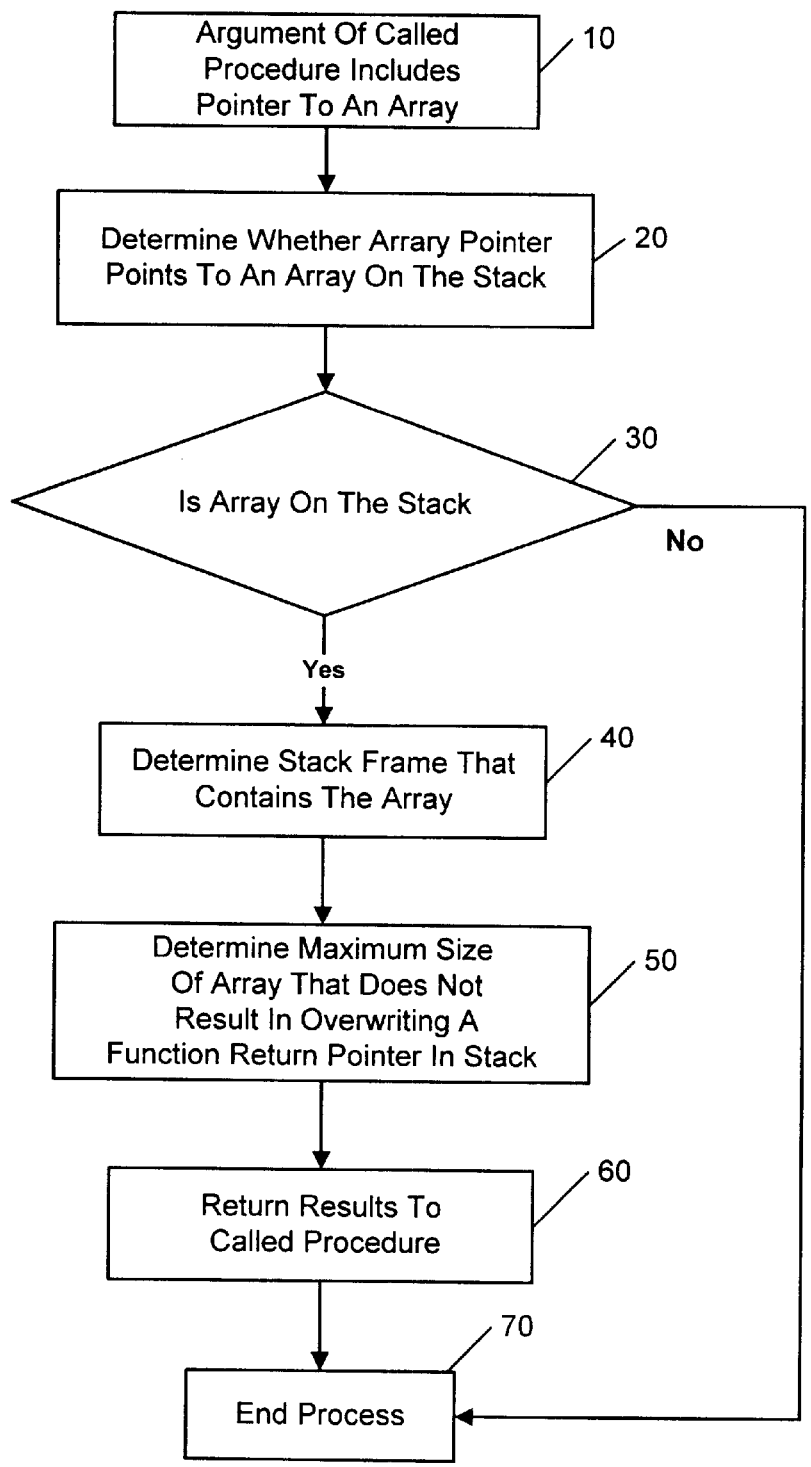
FIG. 3 is a flow diagram of a method for determining a "safe" upper bound on the size of a stack allocated array according to one aspect of the present invention.

Referring now to FIG. 3, a flow diagram illustrates a method for determining a "safe" upper bound for a stack array according to one aspect of the present invention. Initially, given an argument of a called function that points to an array (step 10), a determination is made as to whether the array is located on the stack (step 20). This determination may be made, for example, by checking whether the address pointed to (by the argument) lies within a region between the beginning of the stack and the current stack pointer. By way of example, in the AIX system, this determination is true if the pointer value is between the top of the stack and address 0x2000_0000. It is to be understood that other mechanisms may be employed for determining whether the array is on the program stack.

If it is determined that the array is on the stack (affirmative result in step 30), the next step is to determine the stack frame that actually contains the array pointed to by the argument value (step 40). Preferably, this process is performed by "following the back chain" using the specific mechanism that is used for such task based on the given platform/language. For instance, using the stack structure depicted in FIG. 1, following the back chain is performed using the address values of the Old Frame Pointers of the frames. Therefore, starting at the topmost stack frame, a determination is made as to whether the array is located between the bottom of the current frame and the top of the stack. If so, it is concluded that the current frame contains the array pointer. Otherwise, the beginning (base) of the previous frame (an each previous frame) is determined based on information (e.g., the Old Frame Pointer) in the current frame. In the example of FIG. 1, the value of Arg1 points to the address of array Local VarB in the Previous Stack Frame (which address is located between the Old Frame Pointer2 and the top of the stack). Furthermore, by way of example with reference to FIG. 2, the Back Chain Pointers are used to follow the back chain until the frame containing the Array Pointer is found. This process is repeated using the back chain mechanism until the stack frame containing the array is found.

It is to be appreciated that the process of "following the back chain" may be employed as a mechanism for simultaneously determining (i) whether the array is located on the stack (step 20) and (ii) which stack frame contains the array. In other words, steps 20, 30 and 40 may be merged into one process step since it will be automatically determined that the array in on the program stack if it is located (using the back chain) in a given stack frame.

Once the frame containing the array is found, the "safe" upper bound value (discussed above) is determined, for example, by calculating the maximum size of the array that would not result in overwriting any stack-defined data, preferably, a function return pointer (step 50). The "safe"

upper bound value is found, for example, by computing the distance between the closest function return pointer that is either smaller or larger than the array pointer (the choice of smaller/larger depends on the direction of the stack growth and the array growth, which is fixed for any operating system/language combination).

For instance, with reference to the example in FIG. 1, depending on the growth of array Local VarB, the distance between the beginning of the array and either the Return Address2 (or the Old Frame Pointer2) (assuming the array grows upward) or the Return Address1 (assuming the array grows downward) is determined. Furthermore, by way of example with reference to FIG. 2, the maximum number of bytes that can be safely written to the array is the difference between the Array Pointer and the bottom of the stack frame containing the array. In AIX, the Array Pointer points to the beginning of the array.

Once the value of the "safe" upper bound is determined, the result is returned to the function (step 60) and the process is complete (step 70). The returned "safe" upper bound value is then used by the function to ensure that stack-defined data such as a procedure return pointer is not overwritten while the array data is being written in the stack.

Figure 2:
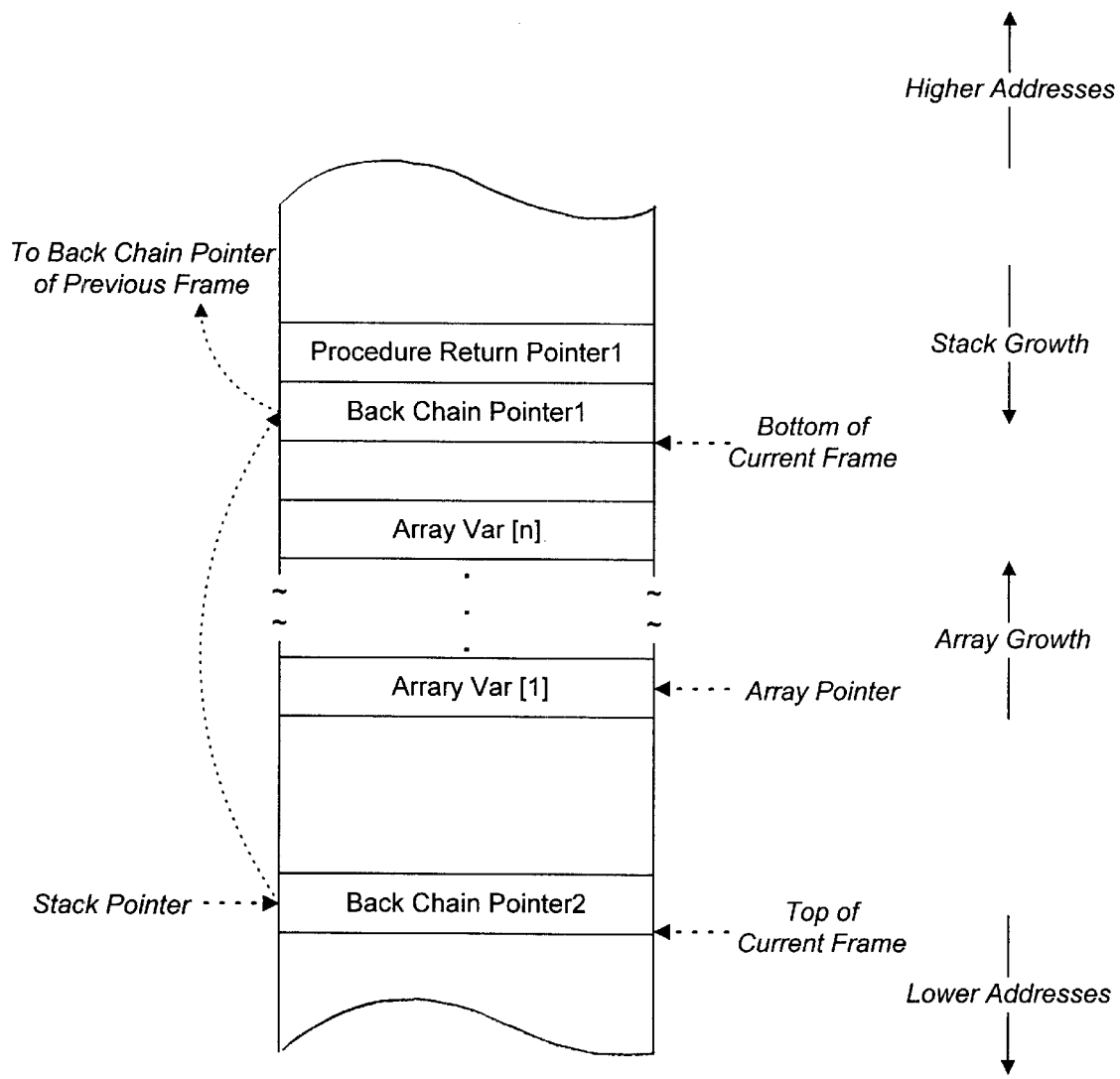
FIG. 2 is a diagram of a portion of a stack in memory illustrating a stack frame structure of an AIX platform according to the prior art.

It is to be appreciated that the process depicted in FIG. 2 can be implemented as a library function/procedural object that is stored in a library. This function may be called by any function to which an array argument is passed to, thereby, appropriately guard against overwriting stack-defined data. This concept is illustrated by the following blocks of code which demonstrate the difference between a conventional gets( ) routine and a modified version of the gets( ) routine that implements a "bounds checking" function referred to as bounds( ) to determine a "safe" upper bound value. A conventional gets( ) function may be written as follows:

```
char*
gets(char a[ ])
{
   int c;
   int i;
   i=0;
   while(1) {
/* read a character */
   c=getc( );
/* if the character is a new line, write a 0, and return */
   if (c=='\n') {
      a[i]=0;
      return i==0?0:a;
   }
/* otherwise write the character, and loop */
   a[i]=c;
     i ++;
   }
}
```

The following block of code is an example of a gets( ) routine that is rewritten to employ a bounds( ) routine implementing the method discussed herein in accordance with the present invention to render the above gets( ) routine immune to stack-smashing attacks:

```
char *
safe_gets(char a[ ])
{
   int c;
   int i;
   int MAX_SIZE;
/* determine the safe upper bound of the array */
   MAX_SIZE=bounds(a);
   i=0;
   while(1) {
/* read a character */
   c=getc( );
/* if the character is a new line OR THE MAX SIZE HAS
   BEEN REACHED, * write a 0, and return */
   if (c=='\n' && i==MAX_SIZE-1) {
      a[i]=0;
      return i==0?0:a;
   }
/* otherwise write the character, and loop */
   a[i]=c;
   i++;
   }
}
```

In the AIX system, the following block of code illustrates a process for determining the "safe" upper bound on the size of an array in accordance with the present invention:

```
unsigned
bounds(void * array)
{
   unsigned array_addr=(unsigned) array_addr;
   unsigned stack_ptr=get_stack_pointer( );
   unsigned back_ptr;
   if(array_addr>stack_ptr array_addr<0x20000000)
   {return MAX_UINT;
   }
   back_ptr=stack_ptr;
   while(back_ptr!=0 && back_ptr<array_addr) {
      back_ptr=*(unsigned *) back_ptr;
   }
   if(back_ptr==0) {
      return MAX_UINT;
   }
   return array_addr-back_ptr;
}
/* get_stack_pointer is an assembly routine */
.get_stack_pointer:
   mr r$3,r$1
   blr
``` where the maximum unsigned value MAX_UNIT is returned if it is determined that the array is not located on the stack.

It is to be appreciated by those of ordinary skill in the art that depending on the specific stack frame structure of the given platform/language, other information and variables may be considered to determine a tighter upper bound value. For instance, in AIX and other operating systems, it is sometimes possible to determine more about the structure of the frame. This information can then be implemented in the exemplary algorithm discussed above to provide a tighter upper bound. For example, additional frame information is typically an annotation added to the procedure associated with the stack frame. In the specific case of AIX, this is known as the tag table, and is a block of data after the last instruction in the procedure. From this table, it is possible to determine how much of the frame is reserved for storing parameters, etc. This array can obviously not be part of this area, so the upper bound on the size of the array is now the difference between the bottom of the frame and the array pointer, less the additional space reserved for storing the parameters, etc.

Although illustrative embodiments of the present invention have been described herein with reference to the accompanying drawings, it is to be understood that the present invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for providing bounds checking on the size of input data being stored in an array, comprising the steps of:
   (a) determining if the array is on a program stack;
   (b) determining a boundary value representing a maximum amount of data that can be written to the array without overwriting a predefined region in the program stack, if the array is determined to be on the program stack, wherein the step of determining a boundary value comprises the steps of locating a stack frame containing the array, and calculating the distance between the beginning of the array and the closest predefined region in the program stack based on a direction of array growth; and
   (c) writing data to the array based on the determined boundary value.

2. The method of claim 1, wherein the method is implemented as a procedural object.

3. The method of claim 1, wherein the predefined region comprises a memory location that is preserved by a calling sequence.

4. The method of claim 1, wherein the predefined region comprises a return pointer.

5. The method of claim 1, further comprising the step of passing the array as an argument to a called procedure, wherein the called procedure executes. steps (a)–(c).

6. The method of claim 1, wherein the step of determining if the array is on a program stack comprises the steps of determining if an address of the array is between a beginning location of the program stack and a top location of the program stack.

7. The method of claim 1, wherein the closest predefined region comprises one of the beginning and end location of the stack frame containing the array.

8. The method of claim 1, wherein the step of locating a stack frame comprises the steps of:
   finding a beginning location of a current stack frame;
   determining if an address of the array is between the beginning location of the current stack frame and a top location of the program stack; and
   if the array is not within the current stack frame, iteratively finding a beginning location of previous stack frames until the array is found.

9. The method of claim 1, further comprising the step of utilizing frame data of a procedure associated with the stack frame containing the array to determine the boundary value.

10. A program storage device, readable by a machine, tangibly embodying a program of instructions executable by the machine to perform method steps for providing bounds checking on the size of input data being stored in an array, the method comprising the steps of:
    (a) determining if the array is on a program stack;
    (b) determining a boundary value representing a maximum amount of data that can be written to the array without overwriting a predefined region in the program stack, if the array is determined to be on the program stack, wherein the step of determining a boundary value comprises the steps of locating a stack frame containing the array, and calculating the distance between the beginning of the array and the closest predefined region in the program stack based on a direction of array growth; and
    (c) writing data to the array based on the determined boundary value.

11. The program storage device of claim 10, wherein the instructions for performing the method steps (a)–(c) comprise a procedural object.

12. The program storage device of claim 10, wherein the predefined region comprises a memory location that is preserved by a calling sequence.

13. The program storage device of claim 10, wherein the predefined region comprises a return pointer.

14. The program storage device of claim 10, further comprising instructions for performing the step of passing the array as an argument to a called procedure, wherein the called procedure executes steps (a)–(c).

15. The program storage device of claim 10, wherein the instructions for performing the step of determining if the array is on a program stack comprise instructions for performing the steps of determining if an address of the array is between a beginning location of the program stack and a top location of the program stack.

16. The program storage device of claim 10, wherein the closest predefined region comprises one of the beginning and end location of the stack frame containing the array.

17. The program storage device of claim 10, wherein the instructions for performing the step of locating a stack frame on the program stack comprise instructions for performing the steps of:
    finding a beginning location of a current stack frame;
    determining if an address of the array is between the beginning location of the current stack frame and a top location of the program stack; and
    if the array is not within the current stack frame, iteratively finding a beginning location of previous stack frames until the array is found.

18. The program storage device of claim 10, further comprising instructions for performing the step of utilizing frame data of a procedure associated with the stack frame containing the array to determine the boundary value.

19. A system, comprising:
    a program stack; and
    a library for storing library functions, the library functions comprising a bounds checking function to provide bounds checking on the size of input data being stored in an array on the program stack, wherein the bounds checking function is called by at least one library function to return a boundary value representing a maximum amount of data that can be written to an array on the program stack without overwriting a predefined region in the program stack, wherein the bounds checking function performs the steps of locating a stack frame containing the array, and calculating the distance between the beginning of the array and the closest predefined region in the program stack based on a direction of array growth.

20. The system of claim 19, wherein the predefined region in the program stack comprises a return pointer.

21. A program storage device, readable by a machine, tangibly embodying a program of instructions executable by the machine to perform method steps for preventing a buffer overflow attack on a program stack, the method comprising the steps of:

allocating a stack frame on a program stack for a called function, wherein the called function comprises an argument that points to an array;

determining a stack frame containing the array;

determining a distance between a beginning location of the array and a location of a function return pointer or back chain pointer, in the stack frame containing the array; and limiting the amount of data written to the array based on the determined distance to prevent the function return pointer or back chain pointer from being overwritten.

* * * * *